United States Patent [19]

Chaki et al.

[11] Patent Number: 5,560,523
[45] Date of Patent: Oct. 1, 1996

[54] APPARATUS FOR MEASURING AND TRANSFERRING LIQUID

[75] Inventors: John J. Chaki, Buckingham; Marc C. Angelillo, Exton; William G. Newsome, Elkins Park, all of Pa.

[73] Assignee: Betz Laboratories, Inc., Trevose, Pa.

[21] Appl. No.: 357,629

[22] Filed: Dec. 16, 1994

[51] Int. Cl.$^6$ .................................................. G01F 11/28
[52] U.S. Cl. ............................................ 222/443; 222/444
[58] Field of Search ............................ 222/63, 318, 372, 222/377, 380, 424, 424.5, 425, 443, 504, 638, 642, 644, 444; B7/563

[56] References Cited

U.S. PATENT DOCUMENTS

| | | | |
|---|---|---|---|
| 3,760,981 | 9/1973 | Weed | 222/443 |
| 3,831,821 | 8/1974 | Doyen | 222/444 |
| 4,318,431 | 3/1982 | Evans | 222/644 |
| 4,513,894 | 4/1985 | Doyle et al. | 222/644 |
| 5,174,472 | 12/1992 | Rague et al. | 222/644 |
| 5,174,474 | 12/1992 | Tammi et al. | 222/318 |
| 5,228,594 | 7/1993 | Aslin | 222/318 |
| 5,427,694 | 6/1995 | Rugg | 222/644 |

*Primary Examiner*—Andres Kashnikow
*Assistant Examiner*—Philippe Derakshani
*Attorney, Agent, or Firm*—Alexander D. Ricci; Matthew W. Smith

[57] ABSTRACT

An apparatus for transferring a discrete, measured volume of liquid from a dispensing container to a liquid receptacle. The apparatus is comprised of a conduit having a solenoid valve, a measuring vessel and a pump. The solenoid valve controls fluid flow from a dispensing container to the measuring vessel. The apparatus prevents accidental drainage of the liquid dispensing container by the pump and eliminates personnel hazards associated with manual transfers of liquids from dispensing containers to receptacles.

4 Claims, 4 Drawing Sheets

APPARATUS FOR MEASURING AND TRANSFERRING LIQUID

FIELD OF THE INVENTION

The present invention relates to an apparatus for transferring liquid and more particularly to transferring a discrete, measured volume of liquid from a dispensing container to a receptacle.

BACKGROUND OF THE INVENTION

Cooling towers, boilers, pulp and paper chests and similar systems commonly utilize chemical treatments to inhibit corrosion, scale, bacteria growth and a host of other problems.

The chemical treatments are often delivered to the system site in large dispensing containers or pails from which the liquid chemical treatments are dispensed into the system. To aid in describing the invention, as discussed herein any system such as a cooling tower, boiler, pulp and paper chest or the like is referred to as a "receptacle" for the chemical treatment liquids. Chemical treatment liquids are typically dispensed into a receptacle in small quantities at predetermined time intervals until the dispensing container is emptied. The empty container is then replaced with a full container or refilled on site.

The transfer of chemical treatment liquid from a dispenser to a receptacle can be accomplished by filling a bucket or other vessel of known volume with liquid from the dispenser, carrying the liquid to a receptacle and pouring it into the receptacle. This transfer has the disadvantages that personnel carrying the liquid to the receptacle are exposed to splashes and spills and are subject to back injuries from lifting and carrying the liquid.

An alternative to manual liquid transfer from the dispenser to the receptacle is to connect a dispenser 2 to a receptacle 3 by pipes 4 and a pump 1 as shown schematically in FIG. 2. This transfer eliminates chemical exposure and back injury risk to personnel. However, in the event that pump 4 is inadvertently actuated or the electrical circuits which actuate pump 4 malfunction, leaving pump 4 actuated, it is possible for pump 4 to drain the dispenser 2 of liquid. This results in a large slug of treatment liquid entering receptacle 3 instead of small, measured volumes added over time. A large slug of treatment chemicals added to receptacle 3 can disrupt the desired chemical makeup within receptacle 3 and leaves the receptacle without any chemical treatment after the slug has passed.

Furthermore, pumping liquid directly into a receptacle is an inaccurate way to deliver a specific volume of treatment liquid since pump speed and efficiency changes over time, resulting in the volumetric delivery of a chemical treatment changing over time.

Thus, a need exists for an apparatus for transferring liquid from a dispensing container to a receptacle which eliminates exposure of personnel to chemicals, eliminates the danger of worker back injury, reduces the danger of dispensing container drainage due to accident or pump malfunction and delivers an accurate volume of liquid to a receptacle regardless of the pump performance over time.

SUMMARY OF THE INVENTION

The present invention is directed to an apparatus for transferring discrete volumes of liquid from a dispensing container to a receptacle. The apparatus comprises a conduit attachable to a dispensing container; a means for opening and closing the conduit attached to the conduit; a liquid measuring vessel in fluid communication with the conduit, and a means for evacuating the vessel into a receptacle.

The preferred means for opening and closing the conduit is a direct acting fail-closing solenoid valve. The most preferred means for evacuating the vessel is a diaphragm pump. The invention has particular utility for transferring discrete measured volumes of chemical treatment liquids from dispensing containers to receptacles such as cooling towers, boilers, pulp and paper chests and the like.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DESCRIPTION OF THE PREFERRED EMBODIMENT

In accordance with the present invention, an apparatus for transferring discrete measured volumes of liquid from a dispensing container to a receptacle is provided.

Figure 1:
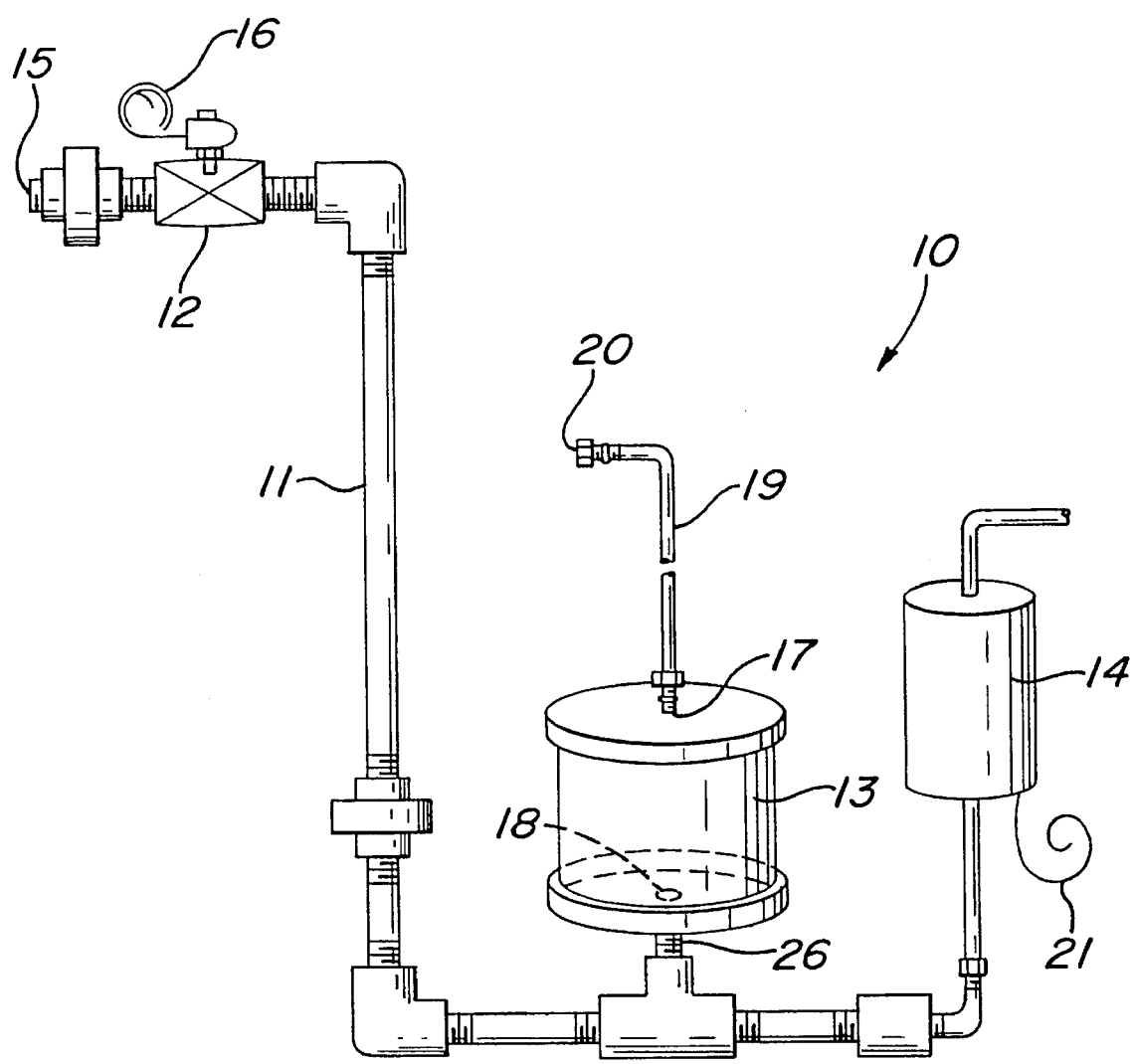
FIG. 1 is a perspective view of the liquid transfer apparatus.
Figure 2:
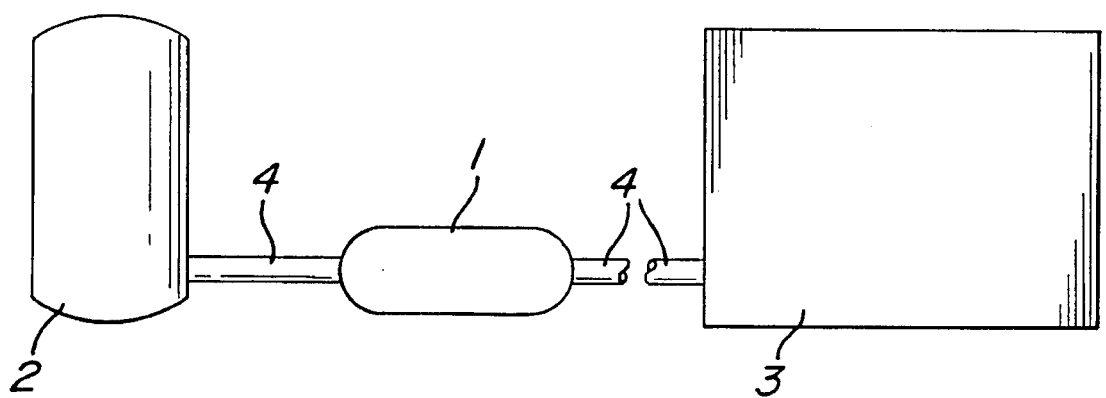
FIG. 2 is a schematic representation of a prior art arrangement to transfer liquid from a dispensing container to a receptacle.

The apparatus of the present invention is shown generally as 10 in FIG. 1. The apparatus is comprised of a conduit 11, a means for opening and closing the conduit 12, a liquid measuring vessel 13 in fluid communication with conduit 11, and a means 14 in fluid communication with vessel 13 for evacuating vessel 13 into a receptacle (not shown in FIG. 1).

Conduit 11 is attachable to a dispensing container such as vat, pail, or other such container at end 15. Conduit 11 can be of one piece construction or can be constructed of several tubes, elbows and other fittings as shown in FIG. 1 to facilitate connection of apparatus 10 to a dispensing container and a receptacle.

Solenoid valve 12 is a direct acting, fail-closing type valve actuated through wiring 16. "Direct acting" as applied herein means the valve opens upon energizing of the solenoid coil without requiring the assistance of liquid pressure on the valve. "Fail-closing" as applied herein means a valve that closes whenever the coil is not energized. Direct acting, fail-closing solenoid valves representative of this type of valve are available commercially from Automatic Switch Company of Florham Park, N.J.

Measuring vessel 13 is a vessel of known volume, having an overfill port 17, and a fill/drain port 18. Port 17 is attached to an overfill tube 19 which is attachable at end 20 to a dispensing container. Port 18 is in fluid communication with conduit 11 via tube 26.

Preferably, at least a portion of measuring vessel 13 and/or overfill tube 19 is transparent to allow an apparatus user to observe filling of vessel 13 by liquid from a dispenser and to allow the user to close solenoid valve 12 when vessel 13 is full. Alternatively, an indicator such as a gauge, alarm or meter can be used to indicate that vessel 13 is full and that solenoid valve 12 can be closed.

The means 14 for evacuating vessel 13 is preferably a pump activated by wiring 21. The pump is most preferably a diaphragm pump which can be run until dry and started dry without damaging the pump. Pumps representative of this type of pump are available commercially from Flojet Corporation of Irvine, Calif.

Figure 3:
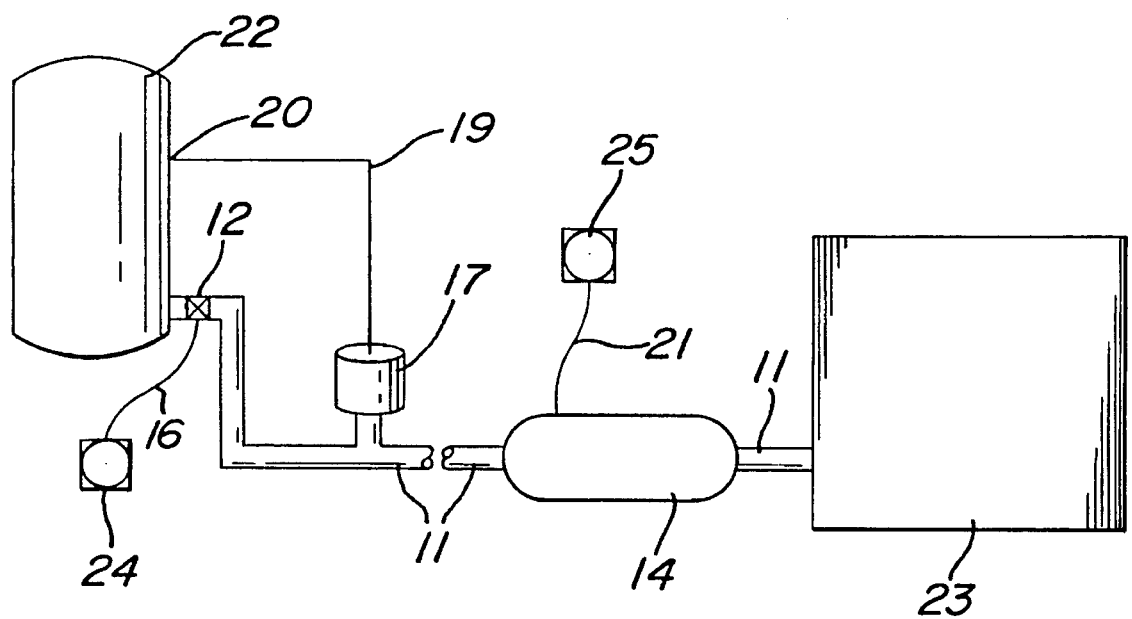
FIG. 3 is a schematic representation of the instant invention attached to a dispenser and a receptacle.
Figure 4:
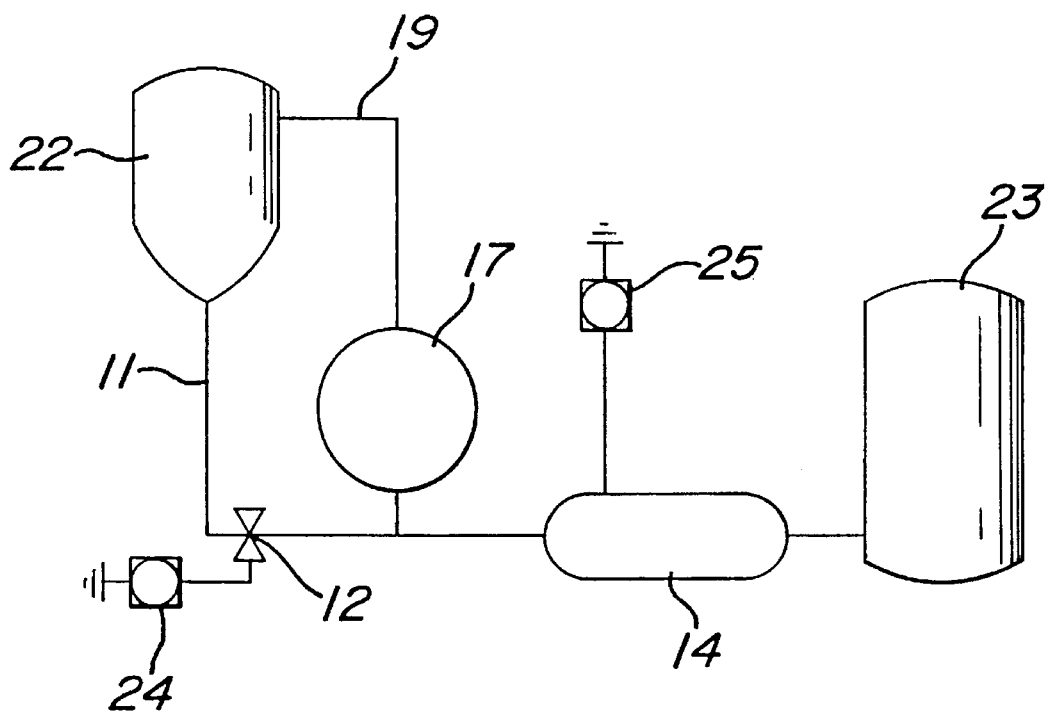
FIG. 4 is a schematic representation of a liquid transfer apparatus wherein the solenoid valve and the pump are actuated by switches.

Apparatus 10 is utilized as shown in FIG. 3. Liquid in dispenser 22 is dispensed to receptacle 23 by actuating solenoid valve 12 with switch 24. Switch 24 is preferably a dead man type switch which opens solenoid valve 12 so long as it is pressed in and closes solenoid valve 12 as soon as the user releases pressure on the switch. Opening of solenoid valve 12 opens conduit 11 allowing liquid in dispenser 22 to gravity fill conduit 11 and vessel 17. Tube 19 is an overfill tube in which liquid fills to the level equivalent to the liquid level in dispenser 22. Closing solenoid valve 12 cuts off fluid communication between dispenser 22 and conduit 11. Pump 14 is then actuated by switch 25. Pump 14 evacuates liquid from conduit 11, vessel 17 and tube 19 and transfers the liquid into receptacle 23. This is illustrated schematically in FIG. 4.

Figure 5:
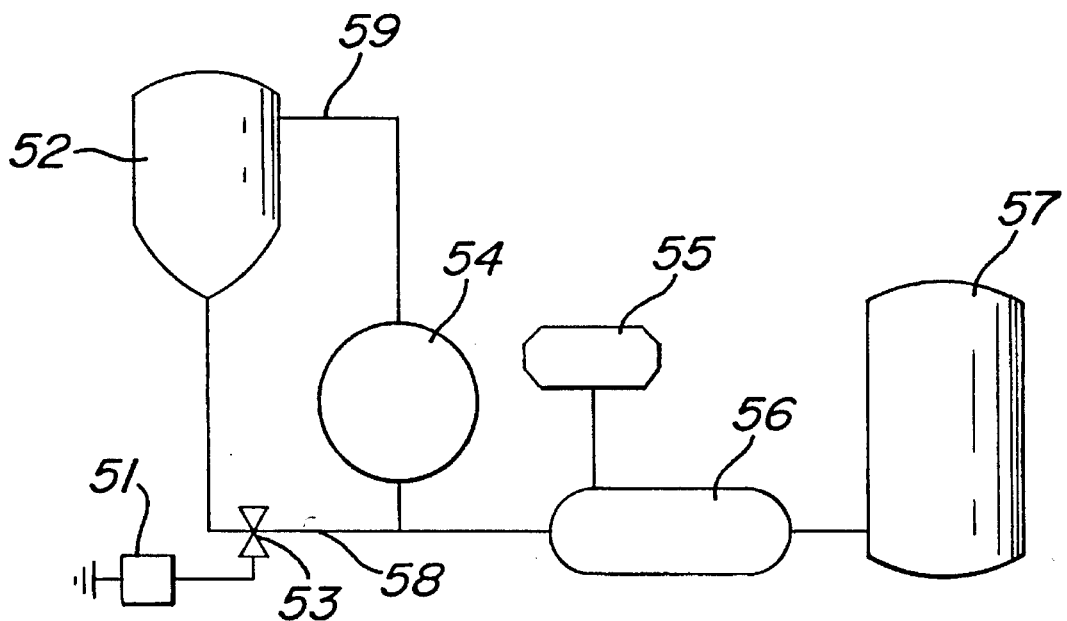
FIG. 5 is a schematic representation of a liquid transfer apparatus wherein the solenoid value is actuated by a timer and the pump is actuated by a programmable logic controller.

FIG. 5 is a schematic illustration of another embodiment of the invention wherein liquid in dispenser 52 is dispensed by actuation of solenoid valve 53 by a timer 51. Liquid is released from dispenser 52 into conduit 58 and into vessel 54. After a predetermined time, timer 51 ceases actuation of solenoid valve 53, thereby terminating fluid communication between dispenser 52 and conduit 58. Controller 55 then actuates pump 56 evacuating liquid from conduit 58, vessel 54 and overfill tube 59 into receptacle 57. After a predetermined time, controller 55 ceases actuation of pump 56 and the cycle repeats. Alternatively controller 55 could also control actuation of timer 51.

Figure 6:
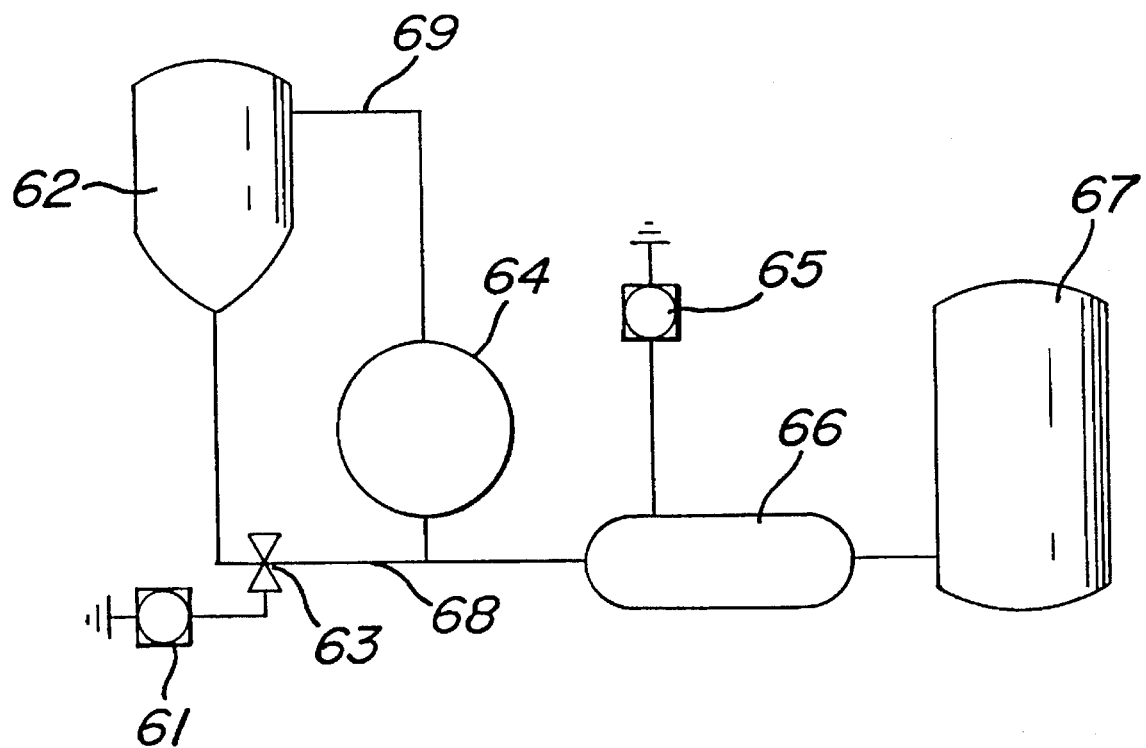
FIG. 6 is a schematic representation of a liquid transfer apparatus wherein the solenoid value and the pump are actuated by timers.

Another embodiment is illustrated schematically in FIG. 6. Liquid in dispenser 62 is dispensed by actuation of solenoid valve 63 by timer 61. Liquid is released from dispenser 62 into conduit 68 and into vessel 64. After a predetermined time, timer 61 ceases actuation of solenoid valve 63 and terminates fluid communication between dispenser 62 and conduit 68. Timer 65 then actuates pump 66 evacuating liquid from conduit 68, vessel 64 and overfill tube 69 into receptacle 67. After a predetermined time, timer 65 ceases actuation of pump 66 and the cycle repeats.

In each embodiment of the invention the measuring vessel and piping are filled with liquid by opening of a solenoid valve, disconnected from fluid communication with the dispensing container by closing of a solenoid valve and the liquid is dispensed into a receptacle. The volume of the measuring vessel and piping are known and the volume of the overflow tube is small in comparison to the volumes of the measuring vessel and the piping. Thus a very consistent discrete amount of liquid is dispensed from the dispensing container and delivered to a receptacle by the invention apparatus each time the apparatus is used. In addition, since a predetermined volume of liquid is dispensed from the dispensing container prior to evacuation into a receptacle, the volume of liquid added to the receptacle is not dependent on the efficiency of the pump during evacuation of the measuring vessel, piping and overflow tube.

Thus, the instant invention provides the user an apparatus for accurately dispensing discrete volumes of liquid from a dispensing container into a receptacle. The apparatus eliminates exposure of personnel to chemicals, eliminates the danger of personnel back injuries due to manual transference of liquids and also reduces the possibility of the container being drained by a pump connecting the container directly to the receptacle in the event of pump failure or human error.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

We claim:

1. An apparatus for transferring measured discrete volumes of liquid from a chemical treatment liquid dispenser to a receptacle, said apparatus comprising:
    a) a conduit attachable to a chemical treatment liquid dispenser;
    b) a direct acting, fail-closing solenoid valve in fluid communication with said conduit;
    c) a gravity filling, liquid measuring vessel, said vessel in fluid communication with said conduit, said vessel having an overflow port attached to a tube attachable to said chemical treatment liquid dispenser and, a fill/drain port; and
    d) a diaphragm pump in fluid communication with said conduit and with said liquid measuring vessel, said pump in fluid communication with a receptacle.

2. The apparatus of claim 1 wherein said receptacle is a boiler, a cooling tower, or a pulp and paper chest.

3. The apparatus of claim 1 wherein said liquid measuring vessel is at least partially transparent.

4. The apparatus of claim 1 wherein said direct acting, fail closing solenoid valve is actuated by a dead-man switch.

* * * * *